United States Patent [19]

Rudszinat

[11] 4,244,250

[45] Jan. 13, 1981

[54] APPARATUS FOR TRANSPORTING TOOLS IN MACHINES FOR THE PROCESSING OF ROD-SHAPED ARTICLES

[75] Inventor: Willy Rudszinat, Dassendorf, Fed. Rep. of Germany

[73] Assignee: Hauni-Werke Körber & Co. KG, Hamburg, Fed. Rep. of Germany

[21] Appl. No.: 951,187

[22] Filed: Oct. 13, 1978

[30] Foreign Application Priority Data

Oct. 19, 1977 [DE] Fed. Rep. of Germany ....... 2746915

[51] Int. Cl.² ............................................. A24C 5/31
[52] U.S. Cl. ...................................... 83/310; 83/154; 83/327; 198/480; 198/792; 414/537; 414/736
[58] Field of Search ................. 83/110, 152, 154, 310, 83/324, 327, 328, 329, 330; 198/480, 689, 792; 414/537, 736

[56] References Cited

U.S. PATENT DOCUMENTS

| | | | |
|---|---|---|---|
| 3,521,513 | 7/1970 | Gomann et al. ................... | 83/327 X |
| 3,952,865 | 4/1976 | Rudszinat et al. ............... | 198/792 X |

Primary Examiner—J. M. Meister
Attorney, Agent, or Firm—Peter K. Kontler

[57] ABSTRACT

Apparatus for transporting knives, sockets, holders and analogous devices for severing, supporting, transferring and/or otherwise manipulating rod-shaped articles which constitute or form part of smokers' products has first and second disks which are rotatable about parallel axes and carry sets of levers each pivotable about an axis which is parallel to the axes of the disks. Each lever of one disk is coupled to a lever of the other disk by a crank unit one pin of which carries a tool. One of the disks is driven and transmits torque to the other disk by way of the levers and crank units whereby the crank units orbit and their pins hold the tools against any change of orientation. Stationary cams have congruent grooves for roller followers which are provided on the levers of the first and second disks, and the cam grooves are configurated in such a way that the cams can reduce or increase the absolute speed of movement of crank pins by moving the pins toward or away from the axes of the respective disks. The tools can transfer rod-shaped articles from a conveyor which transports the articles axially to a conveyor which transports the articles sideways, or vice versa. Also, the tools can constitute sockets which prop spaced-apart portions of a continuous tobacco or filter rod during severing of the rod. The severing mechanism can employ a second apparatus which is mirror symmetrical to the apparatus whose crank units support the sockets, and the tools of the second apparatus include rotary knives cooperating with successive sockets to sever the rod at desired intervals.

14 Claims, 5 Drawing Figures

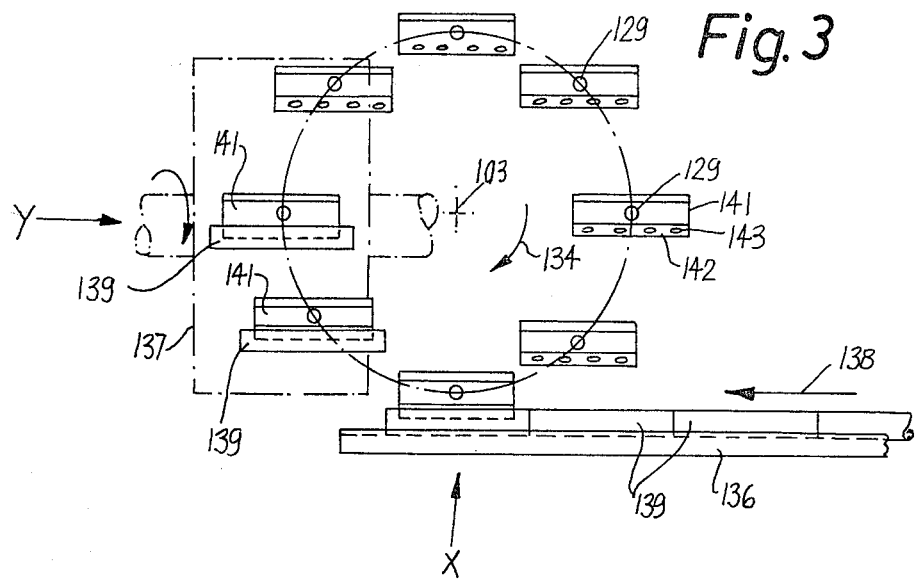
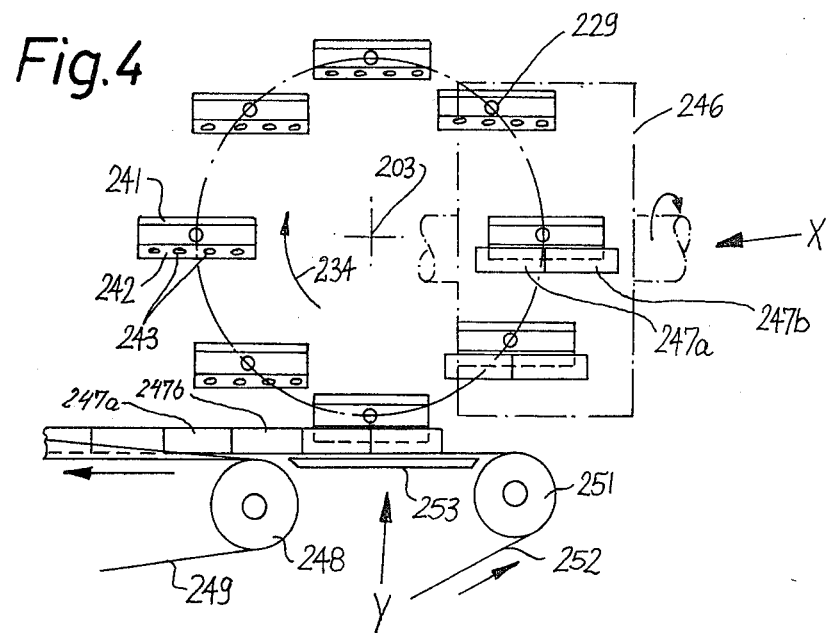

APPARATUS FOR TRANSPORTING TOOLS IN MACHINES FOR THE PROCESSING OF ROD-SHAPED ARTICLES

BACKGROUND OF THE INVENTION

The present invention relates to apparatus for transporting and guiding tools or analogous implements in machines for the processing of tobacco or related commodities, for example, in machines for the manufacture and/or treatment of rod-shaped articles which constitute or form part of smokers' products. Such articles include plain or filter tipped cigarettes, cigarillos or cigars, filter rod sections as well as continuous tobacco-containing rods or filter rods. More particularly, the invention relates to improvements in apparatus of the type wherein tools or like implements are transported along endless paths and in such a way that the orientation of the tools remains unchanged during each and every stage of each cycle.

Commonly owned German Offenlegungsschrift No. 1,632,213 discloses an apparatus wherein two carriers are rotatable about parallel axes and are coupled to each other by several crank units which insure that the orientation of tools which are mounted on one of the carriers remains unchanged while the carriers rotate in response to transmission of torque to the one or the other carrier. The positions of tools are fixed by means of crank units. The German publication further discloses that the tools can be used for transfer of rod-shaped smokers' products between a first conveyor wherein or whereon the articles move sideways and a second conveyor wherein or whereon the articles move lengthwise. The spacing between the centers of neighboring articles remains unchanged. Each tool or implement is a holder which is formed with a flute and with suction ports serving to attract an article to and to retain the attracted article in the respective flute during transfer from the first conveyor to the second conveyor or vice versa. The German publication also discloses that the apparatus which is described therein can serve as part of a mechanism (known as cutoff) which severs a continuous rod containing a rod-like filler of tobacco and/or filter material and a tubular wrapper of cigarette paper, artifical cork or like material which surrounds the filler. The tools which are carried by the apparatus constitute tubular guides each of which has a slot and which serve to guide the rod in the region where, and at the time when, the rod is severed by a rotary knife. The knife extends into the slot of a tubular guide while its cutting edge severs the rod.

The apparatus of the German publication transports the tools along an endless circular path wherein the tools are transported at a constant speed. This reduces the versatility of the apparatus. For example, it is customary and desirable to change the distance between the centers of neighboring rod-shaped articles when a single file of closely adjacent or abutting coaxial articles is converted into a row wherein the articles move sideways. As a rule, the articles of the row are closely adjacent to each other. Examples of such articles are plain cigarettes which issue from a cigarette maker in the form of a single file of discrete articles of unit length and are to be converted into a row of articles which move sideways into and in a filter tipping machine. When the file is converted into a row by resorting to the apparatus of the aforementioned German publication, such apparatus must be followed or preceded by a conveyor which changes the spacing between neighboring cigarettes of the row or file.

When the apparatus of the German publication is used as a means for supporting the aforementioned tubular guides in the cutoff of a machine wherein a continuous rod is subdivided into a file of discrete rod-shaped articles or sections, the speed of a tubular guide, as considered in the longitudinal direction of the rod, matches the speed of axial movement of the rod only at the location where the rod is tangential to the circular path of the tubular guides. Therefore, such apparatus cannot be used (or are impractical) in machines wherein a succession of rod-shaped articles must be placed one behind the other in order to form a continuous rod-like filler or the like. Fillers consisting of a single file of coaxial rod-shaped articles are formed in machines which are utilized for the production of so-called multiplex filter plugs, namely, filter mouthpieces each of which contains two or more rod-like components consisting of different filter materials. The rod-shaped articles which are about to be deposited behind the last article of the rod-like filler are likely to interfere with transport of the preceding articles or vice versa. This will be readily appreciated by bearing in mind that a row of rod-shaped articles which move sideways can be converted into a single file, wherein the articles are immediately adjacent to and coaxial with each other, only if the distance between the axes of the neighboring articles in the row equals the length of an article. If the articles which move sideways are closely adjacent to each other, interference due to clashing between successive rod-shaped articles which approach or are about to enter the path for the single file of articles is unavoidable because each such article has a component of movement in as well as a component of movement at right angles to the direction of movement of the file to the very moment when the article assumes the position of coaxiality with preceding articles of the file.

Attempts to overcome the just discussed drawbacks of the apparatus of the German publication, when such apparatus is used for transfer of successive rod-shaped articles or groups of articles which form a row into a path wherein the articles form a single file and are immediately adjacent to each other, include the utilization of conveyors which move the articles sideways and are provided with widely spaced-apart flutes for the articles as well as the utilization of drive means which effect pronounced acceleration of articles during transport toward the path for the single file of articles. Such attempts have met with limited success, partly due to higher cost and partly because the apparatus are too complex and require frequent attention and extensive maintenance.

Limited versatility of the apparatus which is disclosed in the German publication renders it necessary to replace such apparatus with, or to utilize instead of such apparatus, machines or devices which are complex, prone to malfunction, very expensive and, at least in several important respects, less satisfactory than the apparatus of the German publication.

OBJECTS AND SUMMARY OF THE INVENTION

An object of the invention is to provide a novel and improved apparatus which is especially suited for use as a means to transport and guide tools or the like in machines for the production and/or processing of rod-shaped articles which constitute or form part of smokers' products and which is at least as simple as but more versatile than heretofore known apparatus.

Another object of the invention is to provide an apparatus of the just outlined character wherein the speed of the tools can be varied in a simple and inexpensive way.

A further object of the invention is to provide an apparatus which can satisfactorily transport and guide any and all types of tools or implements which must move along an endless path and must retain their orientation during each and every stage of a cycle, namely, during each movement along the endless path.

An additional object of the invention is to provide an apparatus which can be used for conversion of rows of parallel rod-shaped particles into files of coaxial articles or vice versa, and which can be used with equal advantage to form part of or to constitute the cutoff of a machine for the severing of continuous tobacco-containing rods or filter rods.

A further object of the invention is to provide the apparatus with novel and improved means for changing the speed of the tools during one or more selected stages of cyclical movement of the tools along an endless path.

An additional object of the invention is to provide novel and improved means for driving the tools at a desired speed and for simultaneously insuring that the orientation of tools remains unchanged during each and every stage of each of a series of successive movements along the endless path.

The invention is embodied in an apparatus for guiding tools or other implements in tobacco processing machines or the like. The apparatus comprises first and second carriers (e.g., disks) which are respectively rotatable about parallel first and second axes, a toothed belt or analogous means for rotating one of the carriers, at least one first and at least one second lever, pivot means respectively connecting the first and second levers to the first and second carriers for angular movement about third and fourth axes which are parallel to the first and second axes, means for coupling the levers to each other so that rotation of the one carrier entails rotation of the other carrier by way of such coupling means and orbital movement of the first and second levers about the first and second axes, respectively, a crank unit connected with the levers and having a tool supporting portion whose orientation remains unchanged during rotation of the carriers, and means for simultaneously pivoting the first and second levers about the respective axes during predetermined stages of orbital movement of the levers whereby the pivoting of levers to move the tool supporting portion radially inwardly of the path of orbital movement of the crank unit reduces the absolute speed and the pivoting of levers in a direction to move the tool supporting portion radially outwardly of the path of orbital movement of the crank unit increases the absolute speed of the tool supporting portion.

In accordance with a presently preferred embodiment of the invention, the crank unit constitutes the coupling means between the first and second levers. The levers preferably extend radially outwardly of the respective carriers and are pivoted from such positions during those stages of movement along their respective paths when the absolute speed of the tool supporting portion is to be increased or reduced.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a diagrammatic front elevational view of a slightly modified apparatus which is utilized in a machine or apparatus wherein a file of coaxial rod-shaped articles is converted into a row of parallel articles;

FIG. 4 is a similar diagrammatic front elevational view of a modified apparatus which is utilized for conversion of a row of pairs of coaxial rod-shaped articles into a single file of such articles.

DESCRIPTION OF THE PREFERRED EMBODIMENTS

Figures 1, 2:
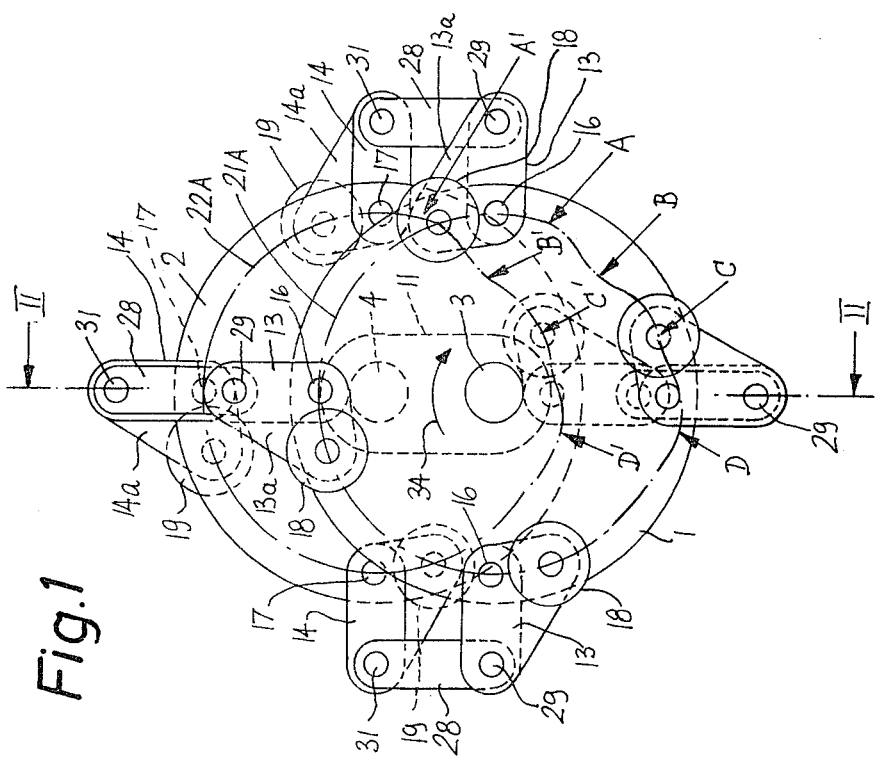
FIG. 1 is a partly schematic front elevational view of an apparatus which embodies one form of the invention, the tools being omitted and the paths along which the crank pins of the crank units are moved in response to rotation of their carriers being indicated by phantom lines.
FIG. 2 is a sectional view as seen in the direction of arrows from the line II—II of FIG. 1.

The apparatus which is shown in FIGS. 1 and 2 comprises two disk-shaped carriers 1 and 2 which are respectively mounted on parallel shafts 3 and 4. The carrier 1 rotates on two antifriction ball bearings 6, 7 and the carrier 2 rotates on two antifriction ball bearings 8, 9. The shaft 4 is rigidly secured to a frame member or wall 12 in a machine which processes smokers' products, and the shaft 3 is fixedly secured to the shaft 4 by a link 11. Thus, the parts 12, 4, 11 and 3 form a rigid unit.

The carrier 1 is connected with a set of equally spaced and normally substantially radially extending levers 13, and the carrier 2 is connected with a set of equally spaced and normally substantially radially extending levers 14. The levers 13 and 14 have bifurcated portions (see FIG. 2) whose arms or prongs straddle the respective carriers. The means for articulately connecting the levers 13 to the carrier 1 comprises pivot pins 16 which are parallel to the shafts 3, 4, and the means for articulately connecting the levers 14 to the carrier 2 comprises pivot pins 17 which are parallel to the pivot pins 16. The substantially triangular front arms 13a of the levers 13 carry roller followers 18, and the substantially triangular rear arms 14a of the levers 14 carry roller followers 19. The roller followers 18 extend into the endless groove 21 of a first fixedly mounted positive motion disk cam 23 which is affixed to the shaft 3, and the roller followers 19 extend into the endless groove 22 of a second positive motion disk cam 26 which is secured to the frame member 12 by bolts, screws or analogous connectors 24.

FIG. 1 shows by phantom lines the endless paths 21A and 22A which are defined by the cam grooves 21 and 22. It will be noted that the paths 21A and 22A are congruent; they are merely offset relative to each other by a distance corresponding to the distance between the axes of the shafts 3 and 4. The apparatus of FIGS. 1 and 2 is designed to support tools (366–368 or 372) of the type shown in FIG. 5. The major portions of the endless paths 21A and 22A are circular, i.e., their centers of curvature are located on the axes of the respective shafts 3 and 4. These paths respectively begin to slope inwardly (i.e., toward the axes of the shafts 3 and 4) at the locations denoted by reference characters A and A', and move nearest to the respective axes at the locations B and B'. The paths thereupon extend outwardly and include portions C and C' whose radii of curvature are identical with the radii of curvature of the major portions of such paths. From there on, the paths 21A and 22A extend outwardly and away from the shafts 3 and 4 toward points (D and D') which are located at a maximum distance from the respective axes, whereupon the paths gradually slope toward the respective axes to merge into the (major) path portions having constant radii of curvature.

Each lever 13 is coupled to the adjacent lever 14 by a crank unit 27 which includes a crank arm 28, a first crank pin 29 which is rigid with the respective crank arm 28 and is rotatable in the corresponding lever 13, and a second crank pin 31 which is rigid with the respective crank arm 28 and is rotatable in the corresponding lever 14. The crank arms 29 extend forwardly beyond the corresponding levers 13 and are rigidly connected with the associated tools (such as the tools 366–368 or 372 of FIG. 5). The crank arms 29, 31 are parallel to the shafts 3, 4 and the distance between the axes of the crank arms 29, 31 forming part of a crank unit 27 equals the distance between the axes of the shafts 3 and 4.

The means for driving the carriers 1 and 2 comprises a toothed belt 33 which receives motion from the main prime mover (not shown) of the machine and drives a gear 32 which is integral with or rigidly connected to the carrier 2. The direction in which the belt 33 rotates the carrier 2 is indicated by the arrow 34.

FIG. 1 merely shows four levers 13 and an equal number of levers 14. It is clear, however, that the number of such lever pairs (i.e., the number of crank units 27) can be reduced to less than four (including one) or increased to more than four (e.g., to eight as shown in each of FIGS. 3, 4 and 5).

The operation:

When the belt 33 is driven by the prime mover of the processing machine to rotate the carrier 2 in the direction indicated by the arrow 34, the crank units 27 and the associated levers 13, 14 drive the carrier 1 in the same direction. During travel of roller followers 18 and 19 in those portions of the cam grooves 21, 22 whose radii of curvature are constant, the angular positions of the levers 13 and 14 with respect to the associated carriers 1 and 2 remain fixed, i.e., the levers extend exactly radially of the respective carriers. This can be seen by comparing the positions of the levers 13, 14 at the twelve and three o'clock positions, as viewed in FIG. 1. The crank arms 29 which support the tools travel along path sections which are portions of circles and the orientation of crank pins 29 (i.e., the angular position of each pin) remains unchanged.

During movement between the portions A–B and A'–B' of the respective paths 21A and 22A, the roller followers 18, 19 cause the corresponding levers 13 and 14 to turn counter to the direction of rotation of the carriers 1 and 2, i.e, the absolute speed of the crank pins 29 and 31 is reduced and the distance between such crank pins and the immediately following crank pins 29 and 31 decreases.

During movement between the portions B–C and B'–C' of the respective paths 21A and 22A, the absolute speed of the crank pins 29, 31 increases and thereupon decreases to match the speed of movement between the twelve and three o'clock positions. The absolute speed of the crank pins 29 and 31 increases during movement from C to D and from C' to D' to thereupon decrease back to the normal or nominal speed as soon as the crank pins reach those portions of the respective paths 21A and 22A whose radii of curvature are constant. In other words, the absolute speed of crank pins 29 and 31 decreases during movement toward the axes of the respective shafts 1 and 2, and such absolute speed increases during movement outwardly and away from the respective shafts. The orientation of tools which are affixed to the crank pins 29 remains unchanged regardless of the absolute speed of such crank pins.

By properly selecting the length of the levers 13, 14 and by appropriate selection of the configuration of endless paths 21A and 22A, the extent of angular movement of levers 13 and 14 during travel along predetermined portions of the respective endless paths can be selected practically at will. This contributes to versatility of the improved apparatus by insuring that the absolute speed of movement of the tools can vary in dependency on the intended use of the tools. Typical examples of situations when the absolute speed of tools must be varied are those when the tools must rapidly remove successive foremost articles of a single file of immediately adjacent (abutting) articles in such a way that the removal of each foremost article does not affect the position and/or condition of the next-following article and/or when the articles are to be inserted into closely adjacent flutes or analogous receiving means of a rotary drum-shaped conveyor.

An important advantage of the improved apparatus is that pivotal movements of the levers 13 and 14 can be superimposed upon the constant-speed movements of the carriers 1 and 2 when it becomes necessary to change the absolute speed of the tool-supporting crank pins 29 with reference to the speed of the carriers during certain stages of orbital movement of the levers and crank units 27 about the respective shafts. The absolute speed of the crank pins 29 decreases when the levers are pivoted to move the crank pins 29 nearer to the axis of the carrier 1, and the absolute speed of the crank pins 29 is increased when the levers 13 and 14 are pivoted in the opposite direction. This renders it possible to move (in certain types of machines wherein the improved apparatus is put to use) the tools which are attached to the crank pins 29 with a constant component of speed in parallelism with a tangent to the path of movement of pivot pins 16. Furthermore, and since the configuration of the cam grooves 21 and 22 can be readily selected in such a way that the crank pins 29 move faster in a first portion and at a reduced speed in a second portion of the path of orbital movement of the crank units 27, the apparatus can be used with advantage as a conveyor which changes the spacing between neighboring articles during transport of such articles between a first or feeding conveyor and a second or accepting conveyor.

It is further within the purview of the invention to provide a discrete parallel motion mechanism for each tool and to provide such mechanisms with follower means which track the respective cams. However, the construction of the apparatus can be simplified if (as shown in FIGS. 1–2) the crank units 27 which couple the levers 13 with the adjacent levers 14 perform the dual function of rotating the carrier 1 in response to rotation of the carrier 2 as well as of fixedly supporting the tools in such a way that the orientation of tools during orbital movement of levers 13 and 14 about the axes of the respective carriers remains unchanged.

The feature that the levers 13 and 14 normally extend radially of the respective carriers is desirable and advantageous because this insures that each and every angular movement of such levers in one direction results in a reduction of absolute speed below a nominal speed and each and every movement of levers in the other direction results in an increase of the absolute speed of tool-supporting crank pins 29 above the nominal speed.

Referring now to FIG. 3, there is shown a portion of a machine or apparatus which can utilize an apparatus embodying the features of the apparatus shown in FIGS. 1 and 2. All such parts of the apparatus of FIG. 3 which are identical with or clearly analogous to corresponding parts of the apparatus of FIGS. 1 and 2 are denoted by similar reference characters plus 100. In fact, FIG. 3 merely shows the shaft 103 and the crank pins 129 of the improved apparatus, and each crank pin 129 is rigid with a tool 141, namely, an elongated channel-shaped holder for plain cigarettes 139 or analogous rod-shaped articles which constitute or form part of smokers' products. The apparatus is installed between the outlet of a maker of plain cigarettes and a rotary drum-shaped row forming conveyor 137 which is provided with peripheral flutes (not specifically shown) each of which is parallel to the axis of the conveyor 137. The cigarette maker includes a prismatic guide channel or trough 136 for a single file of rod-shaped articles 139 which are immediately adjacent to each other and advance in the direction indicated by the arrow 138. It will be noted that the improved apparatus constitutes a conveyor which serves to transfer rod-shaped articles 139 from a first transfer station X where the articles arrive by moving axially (see the arrow 138) to a second transfer station Y where the articles are introduced into successive or selected flutes of the conveyor 137 and begin to move sideways.

Each holder 141 has a flute 142 and several suction ports 143 which are connected with a suction generating device (e.g., a fan, not shown) to attract the articles 139 during transport from the station X to the station Y. The connection between the suction generating device and the ports 143 is terminated when the ports reach the station Y, and the articles 139 are thereupon transferred into the respective flutes of the conveyor 137. The flutes of the conveyor 137 also communicate with suction ports which are connected to a suction generating device as soon as they arrive at the station Y. A cigarette maker which includes a guide channel or trough (corresponding to the part 136 shown in FIG. 3) is disclosed, for example, in commonly owned U.S. Pat. No. 4,063,563 granted Dec. 20, 1977 to Lorenzen. The improved apparatus replaces the accelerating cam 27 which is shown in FIG. 1 of the patent to Lorenzen. The conveyor 28 of Lorenzen corresponds to the conveyor 137 of FIG. 3. It can be said that the trough 136 constitutes a first conveyor which transports the articles 139 lengthwise, that the drum 137 is a second conveyor which transports the articles 139 sideways, and that the improved apparatus constitutes a third (intermediate or transfer) conveyor which transports the articles 139 between the conveyors 136 and 137. The direction of transport of articles can be reversed, i.e., the apparatus of the present invention can transport articles from a conveyor in or on which the articles move sideways to a conveyor in or on which the articles move lengthwise.

The apparatus of FIG. 3 is driven at such a speed that the speed of movement of the crank pins 129 (and hence of the holders or tools 141) in the basic or normal positions of the corresponding levers (not shown in FIG. 3) corresponds to the speed of articles 139 which advance in the trough 136 in the direction indicated by the arrow 138. The paths corresponding to the paths 21A, 22A of FIG. 1 include portions of constant curvature which extend to the transfer station X. The next-following portions of the paths thereupon bulge outwardly (i.e., away from the axes of the respective shafts) so that the absolute speed of the crank pins 129 increases. Thus, the freshly accepted articles 139 are accelerated as soon as they enter the respective flutes 142 to thereby insure that such articles cannot interfere with the transport of the next-following articles to the transfer station X. The paths for the crank pins (including the crank pins 129 of FIG. 3) thereupon bulge inwardly at or at least immediately ahead of the transfer station Y so that the speed of the crank pins 129 decreases during transfer of the respective articles 139 into the oncoming flutes of the conveyor 137. In other words, the speed at which the articles 139 are removed from the trough 136 exceeds the speed at which the articles are delivered to the conveyor 137. This is often desirable and advantageous because the articles 139 can be deposited in closely adjacent flutes of the conveyor 137. The distance between the centers of neighboring articles 139 of the row of articles in the flutes of the conveyor 137 is less than the distance between the centers of articles 139 in the trough 136, i.e., less than the length of an article.

FIG. 4 shows a different machine in which the apparatus of the present invention serves to convert a row of pairs of coaxial rod-shaped articles 247a, 247b which move sideways into a single file of such articles wherein the articles 247a alternate with the articles 247b and move lengthwise. It is assumed that the articles 247a, 247b are filter plugs and that the composition of rod-like fillers of the filter plugs 247a is different from that of the fillers of filter plugs 247b. Such filter plugs are thereupon draped into a web of cigarette paper, imitation cork or like material to form a continuous filter rod which is severed at predetermined intervals to yield a succession of filter mouthpieces which are used in the manufacture of filter cigarettes, cigars or cigarillos having so-called multiplex filters. Reference may be had to commonly owned U.S. Pat No. 4,020,751 granted May 3, 1977 to Greve et al. For example, the apparatus of FIG. 4 can replace the conveyor 28 which is shown in FIG. 1 of the patent to Greve et al.

FIG. 4 merely shows the shaft 203 (which is driven to rotate in the direction indicated by the arrow 234) and the crank pins 229 of the improved apparatus. These parts correspond to the similarly referenced parts of the aparatus which is shown in FIGS. 1 and 2. Each crank pin 229 carries a tool 241 which corresponds to a holder 141 (FIG. 3) and has an elongated flute 242 with suction ports 243 which communicate with the suction intake of a pump or fan during travel from the first transfer station X to the second transfer station Y. The row forming conveyor 246 is similar to the conveyor 137 of FIG. 3, i.e., it is a drum with peripheral flutes for pairs of coaxial rod-shaped articles 247a, 247b. The apparatus transfers pairs of articles 247a, 247b from successive flutes of the conveyor 246 onto a further conveyor 249 which has an endless belt of the type known as garniture. Actually, the apparatus deposits successive pairs of articles 247a, 247b onto a continuous web 252 of wrapping material which is trained over a roller 251 and thereupon advances onto and moves with the upper reach of the conveyor 249. The reference character 248 denotes a pulley for the conveyor 249, and the reference character 253 denotes a platform which supports the web 252 from below at the transfer station Y. It will be noted that the improved apparatus serves to convert a row of rod-shaped articles (wherein each component of the row consists of two coaxial articles 247a, 247b) into a single file wherein the articles 247a, 247b are immediately adjacent to and alternate with each other.

The carriers of the apparatus of FIG. 4 are driven at such a speed that the speed of crank pins 229 and holders 241 matches the speed of the conveyor 249 and web 252. If the distance between neighboring flutes of the conveyor 246 is less than the combined length of a pair of coaxial filter plugs 247a, 247b, the endless path for the crank pins 229 bulges inwardly (toward the shaft 203) ahead of the transfer station X so that the speed of the holders 241 is reduced during transfer of pairs of articles 247a, 247b into their flutes 242. The levers for the crank pins 229 are thereupon held against angular movement with respect to their carriers to insure that successive pairs of articles 247a, 247b can be placed one behind the other (as shown on the conveyor 249) without any clashing between the rear article of a preceding pair which is about to reach the station Y and the front article of the next-following pair of articles. In fact, the next-following pair of articles 247a, 247b moves into partial register with the preceding pair of articles before the preceding pair reaches the web 252.

The crank pins 229 are accelerated as soon as their holders 241 deposit the respective pairs of articles 247a, 247b on the web 252, i.e., the path for the crank pins 229 bulges outwardly and away from the shaft 203. The crank pins 229 are thereupon decelerated to the nominal speed which, as stated above, equals the speed of movement of the conveyor 249 and web 252.

An advantage of the apparatus of FIG. 4 is that it can deposit successive pairs of rod-shaped articles in such a way that the articles form a continuous rod-like filler which is free of gaps between neighboring articles. The filler (wherein the articles 247a alternate with the articles 247b) is thereupon draped into the web 252 and is further processed, for example, in a manner as disclosed in the aforementioned patent to Greve et al.

Figure 5:
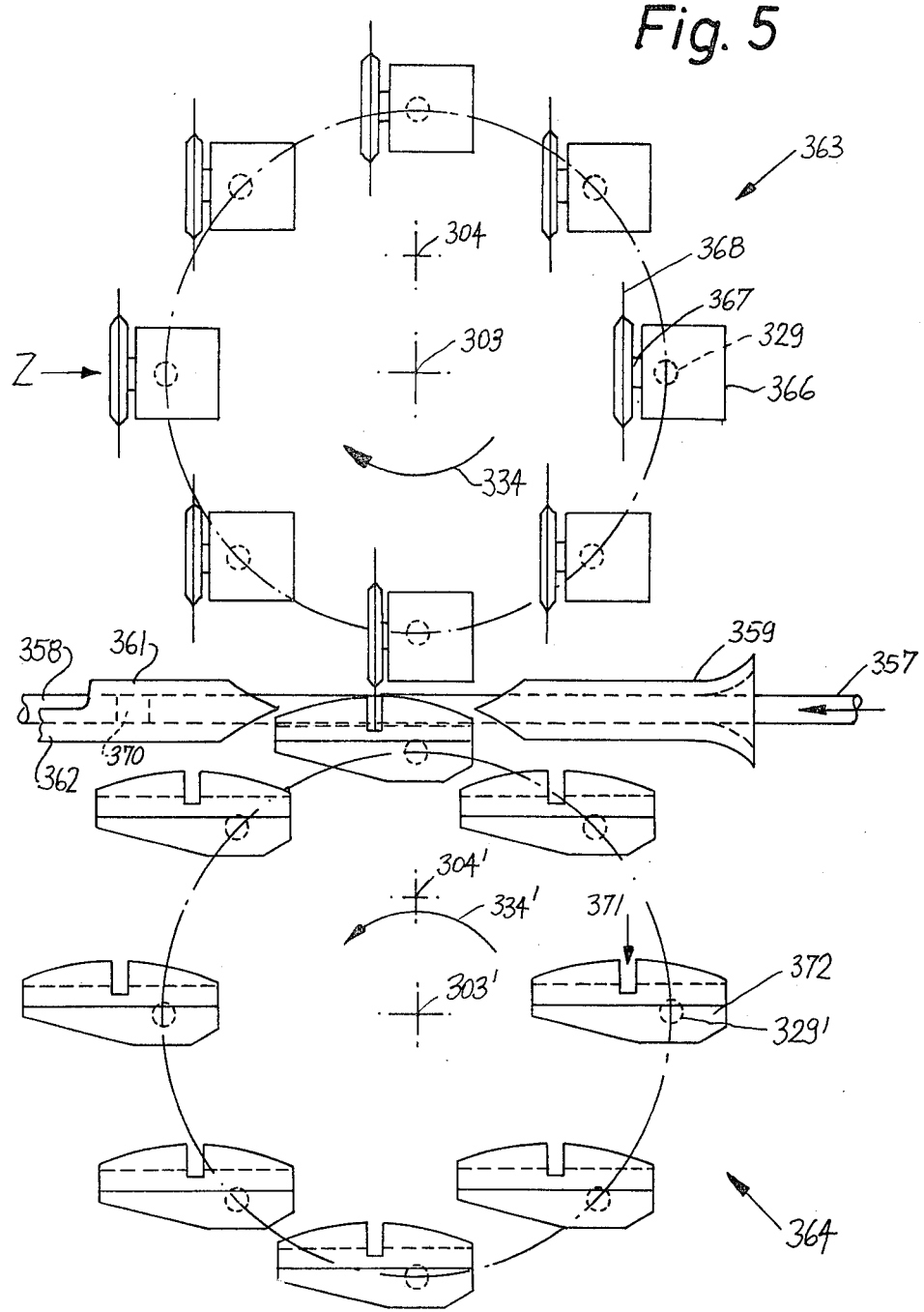
FIG. 5 is a schematic front elevational view of a machine wherein two apparatus of the type shown in FIGS. 1 and 2 replace a conventional cutoff for subdivision of a continuous rod into a file of coaxial rod-shaped articles.

FIG. 5 shows a portion of a machine which embodies two apparatus of the type shown in FIGS. 1 and 2. The two apparatus are mounted mirror symmetrically to each other with reference to a horizontal axis (namely, the axis of a continuous rod 357 which is shown in the middle of FIG. 5). Those parts of the upper apparatus of FIG. 5 which are identical with or clearly analogous to corresponding parts of the apparatus of FIGS. 1 and 2 are denoted by similar reference characters plus 300. The parts of the lower apparatus are denoted by characters corresponding to those used to designate the parts of the upper apparatus but each followed by a prime.

The apparatus of FIG. 5 are utilized to sever the continuous rod 357 so that the latter yields a single file of coaxial rod-shaped articles or sections 358. The rod 357 may constitute a continuous tabacco-containing rod or a continuous filter rod. For example, the apparatus which are shown in FIG. 5 can replace the cutoff 24 which is shown in FIG. 1 of the aforementioned patent to Lorenzen. The machine in which the apparatus of FIG. 5 are installed comprises a stationary tubular guide 359 wherein the leader of the rod 357 advances to the severing station and a second stationary tubular guide 361 which is located downstream of the severing station and directs the sections 358 into a trough-shaped conveyor 362 which corresponds (or can correspond) to the device 136 of FIG. 3.

The upper apparatus of FIG. 5 is denoted by the reference character 363 and the tools which are carried by its crank pins 329 include rotary disk-shaped knives 368 which sever the rod 357 at regular intervals so that the rod yields a single file of discrete sections 358. The lower apparatus of FIG. 5 is denoted by the reference character 364 and its tools 372 constitute sockets serving to support that portion of the rod 357 which is being severed by a knife 368. The crank pins which carry the tools or sockets 372 are shown at 329'.

Each tool of the apparatus 363 further includes a small electric motor 366 whose housing is rigid with the respective crank pin 329 and whose output element 367 carries the respective knife 368. The planes of the knives 368 are parallel to each other and normal to the axis of the rod 357. Thus, the axes of the output elements 367 are parallel to the rod 357 and to the axes of the sectons 358 (while the sections advance through the guide 361 and in the trough 362). The energy source can be connected with the motors 366 by way of the respective crank units (corresponding to the crank units 27 of FIGS. 1 and 2), the rear carrier (see the carrier 2 of FIG. 1) and a slip ring which contacts the rear carrier or its gear.

The open upper sides of elongated flutes of the sockets 372 face the underside of the rod 357. Each socket 372 has a transverse slot 371 for the lower portion of the corresponding knife 368 when the tool (366–368) on a crank pin 329 of the apparatus 363 comes nearest to a tool or socket 372 of the apparatus 364 at the severing station. The slots 371 are sufficiently deep to enable the knives 368 to sever the entire rod 357.

The path along which the crank pins 329 advance when their carrier rotates is identical with the path 21A of FIG. 1, and the path for the crank pins 329' is mirror symmetrical to the path for the crank pins 329. Thus, the crank pins 329 and 329' are accelerated immediately after they reach the severing station, namely, when the knives 368 which reach such station complete the severing of the rod 357. Immediate acceleration of the knives 368 upon completion of the severing step results in forward movement of the freshly separated section 358 away from the leader of the rod 357. One of the resulting gaps is shown at 370. The movements of the crank pins 329 are synchronized with the movements of the crank pins 329', and the orientation of knives 368 and sockets 372 remains unchanged irrespective of changes in absolute speed of the corresponding crank pins.

It has been found that the machine which embodies the apparatus 363 and 364 of FIG. 5 can sever the rod 357 at a very high frequency. Moreover, and since the carriers and the tools thereon are moved continuously (the same as the rod 357), the operation of the machine is surprisingly quiet.

The reference character Z denotes the station where the cutting edges of the knives 368 are sharpened by a grinding wheel whose active surface is treated by a diamond or another suitable dressing tool. The motors 366 drive the respective knives 368 at a relatively high speed so that short-lasting contact between a knife and the grinding wheel suffices to achieve satisfactory sharpening of the cutting edge. However, it is clear that the path for the crank pins 329 can be configured in such a way that it includes a substantially straight portion in the region where the knives 368 travel past the sharpening station so that each cutting edge can be maintained in contact with the grinding wheel for a relatively long interval of time.

The structure of FIG. 5 constitutes a novel and improved cutoff for continuous rods or the like. The apparatus 364 can be used with a different severing unit and the apparatus 363 can be used in combination with a system of mobile sockets other than that shown in the lower part of FIG. 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within th meaning and range of equivalence of the claims.

What is claimed is:

1. Apparatus for transporting and guiding tools in tobacco processing machines or the like, comprising first and second carriers which are respectively rotatable about parallel first and second axes; means for rotating at least one of said carriers; at least one first and at least one second lever; pivot means respectively connecting said first and second levers to said first and second carriers for angular movement about third and fourth axes which are parallel to said first and second axes; means for coupling said levers to each other so that rotation of one of said carriers entails rotation of the other of said carriers by way of said coupling means and orbital movement of said first and second levers about said first and second axes, respectively, said coupling means constituting a crank unit connected with said levers and having a tool supporting portion whose orientation remains unchanged during rotation of said carriers; and means for simultaneously pivoting said first and second levers about the respective axes during predetermined stages of said orbital movement of said levers.

2. Apparatus as defined in claim 1, wherein said levers normally extend substantially radially outwardly of the respective carriers.

3. Apparatus as defined in claim 1, wherein each of said levers comprises follower means and said pivoting means comprises discrete stationary first and second cams which are respectively tracked by the follower means of said first and second levers.

4. Apparatus as defined in claim 3, wherein said cams define congruent paths for the respective follower means.

5. Apparatus as defined in claim 1, further comprising a tool secured to said portion of said crank unit and including holder means for rod-shaped articles, a first conveyor arranged to deliver articles to said holder means in a first portion of the path of orbital movement of said holder means with said crank unit, and a second conveyor arranged to receive articles from said holder means in a second portion of said path.

6. Apparatus as defined in claim 5, wherein said first conveyor comprises means for transporting a single file of articles to said first portion of said path, said second conveyor comprising means for transporting articles sideways from said second portion of said path.

7. Apparatus as defined in claim 5, wherein said first conveyor comprises means for delivering articles sideways to said first portion of said path and said second conveyor comprises means for advancing a single file of coaxial articles lengthwise from said second portion of said path.

8. Apparatus as defined in claim 1, further comprising means for transporting a continuous rod lengthwise, a tool secured to said portion of said crank unit and including a knife having a cutting edge located in a plane which is normal to the axis ofthe rod, said transporting means being arranged to transport the rod adjacent a portion of the path of orbital movement of said crank unit so that said knife severs the rod whenever it enters said portion of said path.

9. Apparatus as defined in claim 8, wherein said tool further includes means for rotating said knife about an axis which is parallel to the rod.

10. Apparatus as defined in claim 9, wherein said rotating means includes an electric motor.

11. Apparatus as defined in claim 1, further comprising means for transporting a continuous rod lengthwise adjacent to a portion of orbital movement of said crank unit, a tool attached to said portion of said crank unit and having a socket which engages and supports the rod whenever said crank unit reaches said portion of said path, and means for severing the rod in said portion of said path while the rod is supported by said socket.

12. Apparatus as defined in claim 11, wherein said socket has a transverse slot for said severing means.

13. Apparatus as defined in claim 11, wherein said portion of said crank unit is a crank pin whose axis is normal to the rod.

14. Apparatus as defined in claim 1, wherein said crank unit comprises a first pin which is mounted in one of said levers, a second pin which is rotatably mounted in the other of said levers and constitutes said tool supporting portion, and a crank arm connected with said pins and rigid with said second pin, said pins being parallel to said axes and the distance between the axes of said pins being equal to the distance between said first and second axes as well as to the distance between said third and fourth axes.

* * * * *